(12) United States Patent
Pham et al.

(10) Patent No.: US 6,803,141 B2
(45) Date of Patent: Oct. 12, 2004

(54) HIGH POWER DENSITY SOLID OXIDE FUEL CELLS

(75) Inventors: Ai Quoc Pham, San Jose, CA (US); Robert S. Glass, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 134 days.

(21) Appl. No.: 10/043,449

(22) Filed: Jan. 10, 2002

(65) Prior Publication Data

US 2002/0127456 A1 Sep. 12, 2002

Related U.S. Application Data

(60) Provisional application No. 60/274,198, filed on Mar. 8, 2001.

(51) Int. Cl.[7] ................................................ H01M 8/12
(52) U.S. Cl. ........................................ 429/33; 429/40
(58) Field of Search ...................................... 429/33, 40

(56) References Cited

U.S. PATENT DOCUMENTS 5,350,641 A  *  9/1994  Mogensen et al. ........ 429/33 X
5,922,486 A     7/1999  Chiao
6,207,311 B1 *  3/2001  Baozhen et al. .......... 429/33 X
6,558,831 B1 *  5/2003  Doshi et al. .............. 429/33 X

FOREIGN PATENT DOCUMENTS

DE        19836132 A1    2/2000
WO     WO 00/39358 A1    7/2000
WO     WO 02/17420 A2    2/2002

* cited by examiner

*Primary Examiner*—John S. Maples
(74) *Attorney, Agent, or Firm*—John P. Wooldridge; L. E. Carnahan; Alan H. Thompson

(57) ABSTRACT

A method for producing ultra-high power density solid oxide fuel cells (SOFCs). The method involves the formation of a multilayer structure cells wherein a buffer layer of doped-ceria is deposited intermediate a zirconia electrolyte and a cobalt iron based electrode using a colloidal spray deposition (CSD) technique. For example, a cobalt iron based cathode composed of (La,Sr)(Co,Fe)O (LSCF) may be deposited on a zirconia electrolyte via a buffer layer of doped-ceria deposited by the CSD technique. The thus formed SOFC have a power density of 1400 mW/cm$^2$ at 600° C. and 900 mW/cm$^2$ at 700° C. which constitutes a 2–3 times increased in power density over conventionally produced SOFCs.

7 Claims, 2 Drawing Sheets

HIGH POWER DENSITY SOLID OXIDE FUEL CELLS

RELATED APPLICATION

This application is related to Provisional Application No. 60/274,198 filed Mar. 8, 2001 entitled "High Power Density Solid Oxide Fuel Cells", and claims priority thereto under 35 USC 120.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to solid oxide fuel cells (SOFCs), particularly to SOFCs utilizing cobalt iron based electrodes, and more particularly to a method for fabricating SOFCs wherein a buffer layer of doped-ceria is deposited by a colloidal spray deposition technique intermediate the zirconia electrolyte and the cobalt iron manganese based electrode, whereby the power density of the SOFCs is increased 2–3 times over conventionally known cells.

(Solid Oxide Fuel Cells) SOFCs are solid state electrochemical devices that convert chemical fuels directly to electricity. Because no combustion is involved, SOFCs are not limited by the Carnot cycle. As a result, SOFCs can have efficiency much higher than conventional power generation devices. The use of SOFCs would result in fuel economy and lower carbon emissions. For these reasons, SOFCs are currently of high interest for clean and efficient electricity generation for stationary and transportation applications.

However, despite many successful demonstrations by Siemens Westinghouse, the SOFC commercialization is still not envisioned for a close future because of the excessive high cost. Such a high cost comes from the inherent low power density of the Westinghouse tubular design (300 $mW/cm^2$ at 1000° C.) and particularly from the manufacturing cost due to the expensive processing techniques. An alternative to the Westinghouse tubular fuel cell is the planar design that has potentially higher power density and can be operated at lower temperatures, 800° C. or lower. The operation at intermediate temperatures makes possible the use of cheaper materials such as the metal interconnect and while putting less constraints on the materials and the gas manifolding system. However, planar fuel cell technology is less mature and a number of issues must be resolved before possible commercialization. In particular, although certain alloys can be used at 800° C., they still tend to oxidize severely after several hundred hours of operation. Therefore, there is strong interest to further decrease this operating temperature to below 700° C. Unfortunately, most of current planar SOFCs loss rapidly performance when temperature decreases. For example, the Honeywell (ex Allied Signal) fuel cell power density drops from 650 $mW/cm^2$ at 800° C. to 350 $mW/cm^2$ at 700° C., that of the European ECN fuel cell drops from 610 $mW/cm^2$ at 800° C. to 270 $mW/cm^2$. Thus, current SOFCs are not suitable for operation at temperature below 700° C. It is noted that very high power density SOFCs, up to $2W/cm^2$ at 800° C. and 1 $W/cm^2$ at 700° C., have been reported by Lawrence Berkeley National Lab and the University of Utah. However, the measurement conditions are unclear. Recently, we have shown that certain testing configurations can yield largely over estimated power density. When single cells are tested in the asymmetric configuration, i.e. where one of the electrodes is significantly larger than the other one and the power density is then normalized to the smaller electrode area, such artificially increased the power density by the favorable normalization effect. The asymmetric cell configuration does not correspond to the actual fuel cell stack operating condition. Therefore, all comparisons should not take into account data obtained using asymmetric configuration.

It is well known that (La,Sr)(Co,Fe)O(LSCF)is a much better cathode material than the conventional (La,Sr)MnO electrode. Unfortunately, the cobalt iron based electrode tends to react with the zirconia electrolyte, causing rapid long-term degradation. A buffer layer of doped-ceria has been proposed to avoid the direct contact of the LSCF electrode with the zirconia electrolyte. Although the concept is interesting, the reduction to practice has not been successful because of the lack of an adequate technique to deposit the buffer coating. For instance, doped-ceria has been deposited on a zirconia electrolyte using sputtering or conventional screen-printing techniques. Cracking of the buffer layer has been observed because of the difference in thermal expansion coefficients between the two layers. No significant performance improvement has ever been reported.

The present invention provides a solution to the above-mentioned problem regarding the formation of a buffer layer between an LSCF electrode and a zirconia electrode. This is accomplished by depositing a doped-ceria buffer layer using a colloidal spray deposition (CSD) technique as described and claims in U.S. Pat. No. 6,358,567, filed Apr. 16, 1999, entitled "Colloidal Spray Method for Low Cost Thin Coating Deposition", whereby the doped-ceria buffer layer is deposited on the zirconia layer without cracking, and then the LSCF electrode is subsequently deposited on top of the buffer layer using the same CSD technique. Thus, the power density of the SOFCs formed by the method of the present invention is increased by 2–3 times over that of the conventional fabricated SOFCs.

SUMMARY OF THE INVENTION

It is an object of the present invention to provide high power density solid oxide fuel cells.

A further object of the invention is to provide a method for depositing a cobalt iron based electrode on a zirconia electrolyte.

Another object of the invention is to provide a high power solid oxide fuel cell utilizes a zirconia electrolyte, a buffer layer, and a cobalt iron electrode.

Another object of the invention is to provide a method for producing solid oxide fuel cells which includes depositing by a colloidal spray deposition technique, a zirconia electrolyte, a doped ceria buffer layer intermediate, and a cobalt iron based electrode, whereby the power density of the cell is increased 2–3 times over conventional cells.

Other objects and advantages of the present invention will become apparent from the following description and accompany drawing. The present invention involves high power density solid oxide fuel cell (SOFC) and method of fabrication. The SOFC fabricated by this invention utilizes a buffer layer between the electrode and the electrolyte formed by a colloidal spray deposition (CSD) technique wherein doped-ceria, for example, as the buffer material can be deposited on a zirconia electrolyte, for example, without cracking, thus solving the above-referenced problems relative to the use of doped-ceria buffer layers for a SOFC fabricated from an (La,Sr)(Co,Fe)O (LSCF) electrode and a zirconia electrolyte. The doping element for ceria can be any element of the lanthanides, but preferably gadolinium or yttrium. By this invention composite cathodes may be produced by a mixture of doped-ceria with LSCF instead of the single component LSCF electrode, resulting in higher performance. SOFC produced by the method of this invention have shown a peak power density of 1400 mW/cm$^2$ at 800° C. using hydrogen fuel which is a factor of about two higher than the above-reference SOFCs. Also, at 700° C., the peak power density was 900 mW/cm$^2$. The CSD technique used to produce at least the doped-ceria buffer layer may be carried out by the method of above references application Ser. No. 09/293,446.

BRIEF DESCRIPTION OF THE DRAWINGS

The accompanying drawings, which are incorporated into and form a part of the disclosure, illustrate embodiments of the invention and, together with the description, serve to explain the principals of the invention.

DETAILED DESCRIPTION OF THE INVENTION

Figure 1:
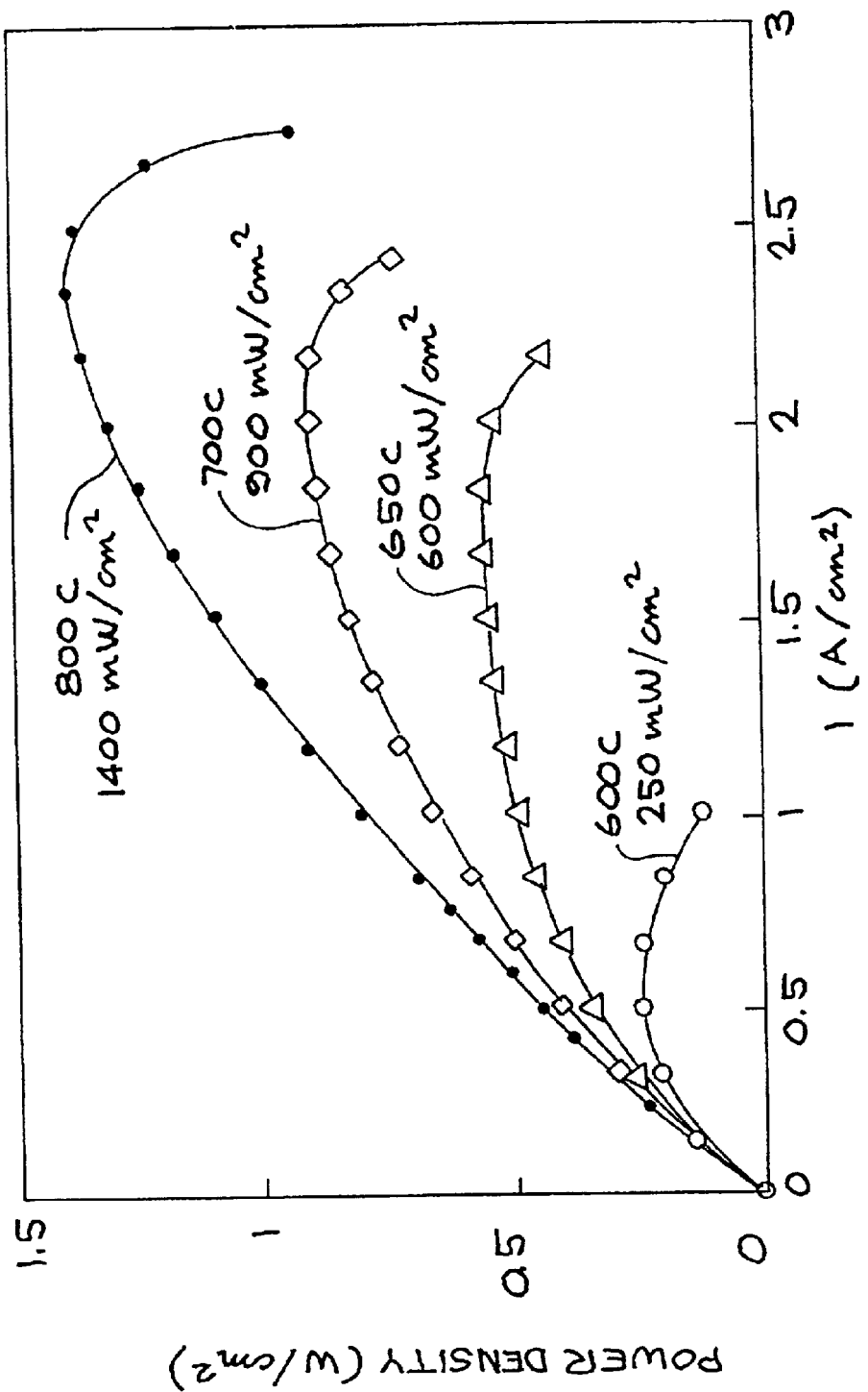
FIG. 1 graphically illustrates power density plots of SOFCs at various temperatures and which were fabricated in accordance with the present invention.

The present invention is directed to high power density solid oxide fuel cells (SOFCs) produced by a method which at least includes the formation of a buffer layer by a colloidal spray deposition (CSD) technique between the electrolyte and the electrode. The SOFCs of this invention includes a cobalt iron based electrode and a zirconia electrolyte with a doped-ceria buffer layer therebetween. As the result of producing a doped-ceria buffer on a zirconia layer without cracking by use of the CSD technique, SOFCs with cobalt iron based electrodes have been produced having a power density of 2–3 times greater than SOFCs using conventional (La,Sr)MnO electrodes. The SOFCs described herein and tested for power density utilized a cobalt iron based electrode, such as (La,Sr)(Co,Fe)O (LSCF) a zirconia electrolyte, (yttria-stabilized zirconia or scandia doped-zirconia), and a buffer layer of doped-ceria, with the doping element being any element of the lanthanides, but preferably gadolinium or yttrium, with at least the buffer layer being deposited by the CSD technique, such as described in above referenced application Ser. No. 09/293,446. The CSD technique enabled the formation of a doped-ceria buffer layer on the zirconia electrolyte without cracking, thus solving the prior problems relative to formation of the buffer layer.

In the SOFCs tested to verify the invention, the doped-ceria buffer layer was deposited by CSD on top of a zirconia electrolyte layer without cracking, and whereafter the LSCF electrode was subsequently deposited on top of the buffer layer using the same CSD technique. The use of the CSD technique is preferable in order to obtain the right microstructure for the LSCF electrode. Such a microstructure is not accessible using the conventional screen-printing technique. However, the LSCF electrode can be deposited by techniques other than by CSD but with lower performance.

While the CSD technique if fully described and illustrated in above-reference application Ser. No. 09/293,446 the following sets for a brief description of the CSD technique and apparatus for carrying out the techniques. A colloidal sol is delivered via a pumping apparatus, such as a liquid pump, to liquid dispersing apparatus, such as an ultrasonic nozzle, that sprays a mist of fine droplets onto a substrate that has been heated to a desired temperature by a heater which may or may not contact the substrate. The particles of the colloidal sol are dispersed onto the substrate as a mist of droplets of the mixture, with the droplet usually being of maximum crosssection dimension of less than 100 microns, and preferably from about 1 to about 50 microns. While various spraying apparatus may be used, ultrasonic spraying is a preferred mode.

The CSD method involves heating the substrate close to or above the boiling point of solvent. Upon impact of the droplets on the heated substrate, the solvent evaporates leaving the powder in the form of a compact layer of the particles, i.e., a green film. The essentially instantaneous removal of the solvent by heating allows a continuous deposition of the coating. Following the coating step, the substrate and the coating can be co-sintered at high temperature to form a fully dense, sintered coating.

A substrate comprising any material may be coated by the method, including for instance, glasses, metals, ceramics, and the like. The substrate surface can have any shape, including planar or no-planar surfaces. The substrate can have a low surface area to be coated or the method of the invention can be scaled up to coat objects of very large surface areas.

The solvent employed to suspend the particles can be an organic liquid, aqueous liquid or a mixture of both. The selection of the solvent is determined by the materials(s) to be coated as well as the substrates. The solvent must be compatible with the powder (i.e., particles) of the coating material so that a stable colloidal dispersion can be obtained. The solvent must have sufficient volatility so that it can easily be removed when the spray impinges on the heated substrate. Organic solvents such as ethanol, acetone, propanol, toluene are most commonly used. In general, a dispersant, a binder and/or a plasticizer are introduced into the solvent as additives. The dispersant aids in stabilizing the colloidal suspension; the binder adds some strength to a green film initially formed on deposition onto the substrate; and the plasticizer imparts some plasticity to the film. Such practices are known in conventional colloidal processing techniques.

Normally the substrate is heated in the range from about room temperature to about 400° C., but in any case, the substrate is held at a temperature lower than the temperature at which the particles chemically decompose into simpler converted products, such as those which may occur in a spray pyrolysis process. Furthermore, if an organic carrier medium is used, the temperature must be below that which would destroy the organic by breaking bonds, or by chemical reactions with the atmospheric elements to which the organic is exposed. Therefore, the organic liquids useful as carrier media normally have a boiling point below about 400° C. at standard temperature and pressure (STP).

Although the substrate is heated, the dispersing of the particles, such as by spraying, or aerosol-assisted deposition, is usually conducted under ordinary conditions of temperature and pressure, such as 25° C. and 1 atmosphere pressure (RTP).

Most powders of any material that have small enough particle size can be suspended in an appropriate solvent as a colloidal suspension for coating. The primary requirement for a stable colloidal solution or suspension is to obtain a powder form of the material to be coated (element or compound) and an average particle size of such material that is sufficiently small enough. Usually fine particles of the material to be coated are less than 10 microns, but in some instances they must be less than 1 micron and even less than 0.5 micron. Although any concentration of particles can be suspended in the carrier medium (i.e., solvent), usually the concentration is in the range from about 0.1 to 10 weight percent, of particles in the solvent.

The materials that can be considered for coating using the subject invention include any pure or mixed metals or compounds, particularly ceramic precursor materials, as for example, all metals, metal oxides, carbides, nitrides, silicides, and the like. Preferred compounds include the elements Y, Zr, elements 57–71, Al, Ce, Pr, Nd, Pm, Sm Eu, Gd, Th, Dy, Ho, Er, Tm, Yb, Lu, Sc, Ti, V, Cr, Mn, Fe, Co, Ni, Cu, Zn, Bi, Th, Pb, O, C, N, and Si. Although single phase materials can be coated onto the substrate, composite or multilayer coatings are also obtainable.

Multilayer coatings can be created using sequential processing of different colloidal solutions, each containing one or more compositions desired in the final coating. The solutions can be delivered to a single nebulizers via different liquid pumps or through different nebulizers. The compositions of the multilayers can be graded in a continuous or discontinuous manner. A coating of continuously graded or discontinuously graded (including stepped) composites can be processed by codepositing different solutions onto a substrate. For example, a coating with a graded composition structure can be processed by simultaneously processing different solutions and controlling the pumping speed of the different solutions through the same or different nebulizers, as illustrated in an example provided below.

After the particles have been dispersed upon the substrate, the resulting green film is sintered at times and temperatures sufficient to produce a final coating having desired properties. Generally, dense coatings require sintering temperatures, with fully dense coatings requiring the highest. If a porous coating is desired, the sintering temperature must be kept sufficiently low to avoid total densification due to particle growth.

A desirable feature of the invention is that the sintered coating can be relatively thick and yet crack free. The coatings also have excellent adhesion to the substrate. Although the thickness of the coating can be varied in the range of less than 1 micron to several hundred microns by controlling the deposition time, the thickness is usually up to about 250 microns, and preferably about 1 to about 100 microns; however, thicknesses of the coating greater than 10 microns, greater than 20 microns, and greater than 40 microns can be conveniently produced by controlled dispersion of the colloidal solution and a single sintering step.

FIG. 1 graphically shows power density at various temperatures for SOFCs fabricated as described above, with 600° C. indicated by white circles, 650° C. indicated by triangles, 700° C. indicated by diamond shapes, and 800° C. indicated by block circles. The cell peak power density was 1400 mW/Cm$^2$ at 800° C. using hydrogen fuel. This value is about a factor of two higher than the above referenced Honeywell (ex Allied Signal) cell performance. At 700° C., the peak power density was 900 mW/cm$^2$, almost three times higher than values reported in the literature, as exemplified above.

Figure 2:
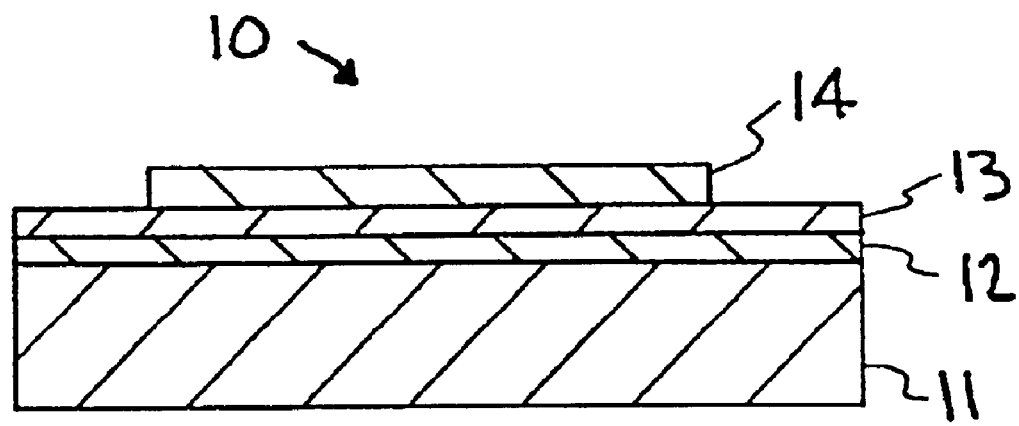
FIG. 2 illustrates in cross-section an embodiment of an SOFC electrode made in accordance with the present invention.

FIG. 2 illustrates an embodiment of a electrolyte/buffer layer/electrode structure made according to the method of the invention. As shown, the structure, generally indicated at 10, comprises a NiO/YSZ anode support layer 11 of an electrolyte, such as zirconia doped with yttria or scandia, ytterbia or a mixture of 2 doping elements, a layer 12 of YSZ deposited on the layer 11 by CSD, as described above, a layer 13 of doped-ceria deposited on layer 12, and an electrode layer 14 of cobalt iron based material, such as LSCF, deposited on the layer 13 by CSD. For example, the electrolyte layer 11 may have a thickness of 1 to 40 μm, preferably 1 to 20 μm with the doped-ceria layer 13 having a thickness of 0.5 to 40 μm, preferably 0.5 to 5 μm, and the electrode layer 14 having a thickness of 10 to 100 μm.

Using a composite cathode made of a mixture of doped-ceria with LSCF instead of the single component LSCF electrode, even higher performance can be obtained. The optimum configuration on the cathode side is a doped-zirconia/doped ceria/LSCF+doped-ceria/LSCF structure. The zirconia may be doped with yttria, ytterbia, or scandia, for example. The outer LSCF layer of that structure serves as the current collector. The doping element for ceria can be any of the, lanthanides but preferably gadolinium or yttrium.

Figure 3:
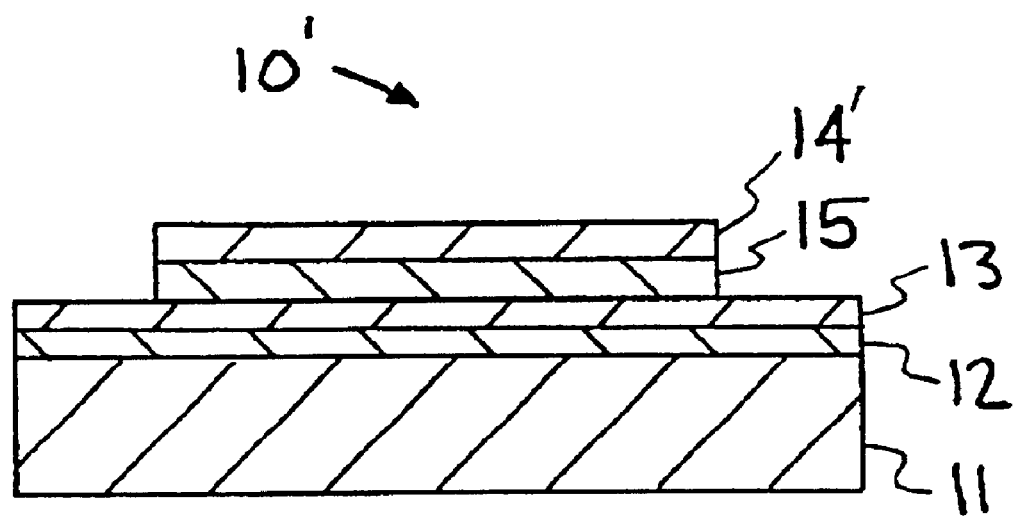
FIG. 3 illustrates in cross-section and embodiment of a cathode side of an SOFC made in accordance with the present invention.

FIG. 3 illustrates an embodiment of the above-described cathode side structure using a layer of LSCF+doped-ceria in addition the LSCF electrode layer of FIG. 2, and similar components are provided with corresponding reference numerals. As seen in FIG. 3, the structure indicated at 101 is similar to the structure 10 of FIG. 2, the difference being the addition of a layer 15 of LSCF+doped-ceria deposited by CSD, and the outer LSCF layer 14[1] serves as the current collector.

It has thus been shown the by the use of the CSD technique to form a buffer layer of doped-ceria intermediate a zirconia electrolyte and a cobalt iron based electrode, the power density of SOFCs can be significantly (2–3 times) increased. The method of the present invention can be carried out at various temperatures and the CSD technique enables disposition on a variety of materials and material shapes. The critical feature of this invention involves the deposition of a buffer layer without cracks, whereby cobalt iron based electrodes can be utilized with a zirconia electrolyte, thereby significantly advancing the state-of-the-art of SOFCs, by increasing the power density by at least a factor of two, and enables the use of lower temperatures than those currently used.

While particular series of operational steps, along with specific materials, parameters, etc. have been described to exemplify and teach the principles of the invention, such are not intended to be limiting. Modifications and changes may become apparent to those skilled in the art, and it is intended that the invention be limited only by the scope of the appended claims.

What is claimed is:

1. A solid oxide fuel cell, comprising:
   a zirconia electrolyte,
   a doped-zirconia layer deposited on said zirconia electrolyte;
   a doped ceria layer deposited on said doped-zirconia layer;
   a LSCF+doped-ceria layer deposited on said doped ceria layer, and
   a LSCF layer deposited on said LSCF+doped-ceria layer, and wherein said LSCF layer functions as a current collector.

2. The solid oxide fuel cell of claim 1, having a power density in the range of 250 mW/cm$^2$ to 1400 mW/cm$^2$ at a temperature range of 600° C. to 800° C.

3. The solid oxide cell of claim 1, wherein said LSCF layer comprises (La,Sr)(Co,Fe)O.

4. The solid oxide fuel cell of claim 1, wherein said doped-ceria layer comprises ceria doped with a lanthanide.

5. The solid oxide fuel cell of claim 4, wherein said ceria is doped with gadolinium or yttrium.

6. The solid oxide fuel cell of claim 1, wherein said electrolyte has a thickness of 1–40 μm, wherein said doped-ceria layer has a thickness of 10–100 μm, and wherein said LSCF layer has a thickness of 1–20 μm.

7. The solid oxide fuel cell of claim 6, wherein said electrolyte has a thickness of 1–20 μm, and said doped-ceria layer has a thickness of 0.5–5 μm.

* * * * *